United States Patent
Huang et al.

(10) Patent No.: US 7,888,283 B2
(45) Date of Patent: Feb. 15, 2011

(54) IRON PROMOTED NICKEL BASED CATALYSTS FOR HYDROGEN GENERATION VIA AUTO-THERMAL REFORMING OF ETHANOL

(76) Inventors: Lihong Huang, 5606 Whitcomb Ter., Indianapolis, IN (US) 46224; Jian Xie, 5724 Pebblestone Ct., Carmel, IN (US) 46033

( * ) Notice: Subject to any disclaimer, the term of this patent is extended or adjusted under 35 U.S.C. 154(b) by 0 days.

(21) Appl. No.: 12/333,987

(22) Filed: Dec. 12, 2008

(65) Prior Publication Data

US 2010/0150823 A1     Jun. 17, 2010

(51) Int. Cl.
B01J 23/00 (2006.01)
B01J 21/00 (2006.01)
B01J 20/00 (2006.01)

(52) U.S. Cl. ............... 502/335; 502/258; 502/259; 502/327; 502/332; 502/336; 502/337; 502/338; 502/349; 502/350; 502/355; 502/415; 502/439

(58) Field of Classification Search ............... 502/258, 502/259, 327, 332, 335, 336, 337, 338, 349, 502/350, 355, 415, 439
See application file for complete search history.

(56) References Cited

U.S. PATENT DOCUMENTS

| | | | | |
|---|---|---|---|---|
| 3,397,154 A | * | 8/1968 | Talsma ................... | 502/304 |
| 3,673,116 A | * | 6/1972 | Richter .................. | 502/300 |
| 3,711,397 A | * | 1/1973 | Martinsons ............ | 205/474 |
| 4,054,469 A | * | 10/1977 | Jackson ................. | 148/404 |
| 4,956,068 A | * | 9/1990 | Nguyen et al. ........ | 205/350 |
| 4,985,387 A | * | 1/1991 | Prigent et al. ......... | 502/304 |
| 5,069,771 A | * | 12/1991 | Nguyen et al. ........ | 204/292 |
| 5,084,438 A | * | 1/1992 | Matsubara et al. .... | 505/235 |
| 5,403,547 A | * | 4/1995 | Smith et al. ........... | 420/581 |
| 2003/0102228 A1 | * | 6/2003 | Nora et al. ............. | 205/384 |

* cited by examiner

*Primary Examiner*—Cam N Nguyen
(74) *Attorney, Agent, or Firm*—C. John Brannon; Brannon Sowers Hughel PC (57) ABSTRACT

A composition for catalyzing the auto-thermal reformation of ethanol, including a porous refractory substrate with a nickel-iron-aluminum oxide material at least partially filling the pores. The substrate is typically an alumina-based ceramic, such as gamma alumina or mullite. The catalyst composition is typically produced by identifying a refractory substrate having a relatively high surface area, such as through the existence of a pore network, infiltrating the refractory substrate with iron oxide and nickel oxide precursors, and combining the iron oxide and nickel oxide precursors with aluminum oxide to form a hybrid nickel-iron-aluminum oxide material at least partially coating the refractory substrate.

14 Claims, 6 Drawing Sheets

IRON PROMOTED NICKEL BASED CATALYSTS FOR HYDROGEN GENERATION VIA AUTO-THERMAL REFORMING OF ETHANOL

ACKNOWLEDGEMENT

Research leading to this novel technology was federally supported by grant no. W911NF-07-2-0036 from the United States Army Research Laboratory. The government retains certain rights in this novel technology.

TECHNICAL FIELD

The novel technology relates generally to the field of ceramic oxide materials, and, more particularly, to an iron-promoted nickel aluminum spinel composition for extracting hydrogen from organic compounds such as ethanol.

BACKGROUND

Hydrogen has been considered as a clean and promising candidate for use as a fuel source alternative to conventional fuel sources, such as petroleum. Hydrogen can be obtained from renewable sources, such as water and biomass, through thermal or catalytic processes. Developing these processes for extracting hydrogen will allow the utilization of a diverse set of domestic resources to more fully address our energy needs. Further, using hydrogen as a fuel source will enable the reduction of our energy dependence on fossil fuel, allow us to cut greenhouse gas emissions, and help ensure a stable and sustainable energy supply.

Typically, hydrogen is produced from bio-ethanol through catalytic steam reforming (SR), a process which may be employed to provide hydrogen to fuel cell systems. However, SR is still limited in application since it is a highly endothermic process and is hampered by the lack of long-term stable and coke resistant catalysts. Auto-thermal reforming of ethanol (ATRE) is an alternative process for generating hydrogen and is characterized by a relatively reduced rate of carbon deposition and a more energetically favorable thermal equilibrium, which can be varied as a function of the oxygen feed. A relatively high yield of hydrogen can be achieved using noble metal based catalysts, but the high cost of noble metals imposes economical and large-scale limit to the practical applications of ATRE. Alternately, non-precious metal-based catalysts show a relatively high catalytic performance but only at elevated operating temperatures. For example, nickel based catalysts are inexpensive and fairly plentiful, but give an unacceptably low hydrogen yield at low temperatures. Further, the known catalysts tend to suffer from catalyst deactivation due to sintering and carbon deposition on the catalyst surface. Thus, there remains a need for inexpensive and plentiful catalyst compositions that are capable of generating substantial hydrogen yields at relatively low temperatures. The present novel technology addresses this need.

SUMMARY

The present novel technology relates to an iron promoted nickel spinel catalyst material and a method of using the same to generate hydrogen via the auto-thermal reforming of ethanol.

One object of the present novel technology is to provide an improved catalyst for use in the auto-thermal reforming of ethanol to generate hydrogen. Related objects and advantages of the present novel technology will be apparent from the following description.

DESCRIPTION OF THE PREFERRED EMBODIMENTS

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

The present novel technology relates to iron-promoted nickel-doped alumina compositions formulated for use as ATRE catalysts. Typically, the compositions include complex oxides of aluminum doped with nickel and iron. The base oxide is not necessarily restricted to alumina, and the doping metals do not necessarily exclude the addition of other column VIII B transition metals.

Typically, the compositions are produced by adding about 15 weight percent nickel oxide (typically in the form of NiO) to a porous ceramic substrate, along with between about 2 and about 15 weight percent iron oxide (typically in the form of $Fe_2O_3$). The ceramic substrate is typically porous alumina or silica, but may be any convenient refractory composition, such as, for example, mullite, zeolite, titania, zirconia, ceria, or the like.

In one embodiment, nickel-based catalyst samples were prepared through a wetness impregnation process. Aqueous solutions of nickel nitrate and iron nitrate were prepared and applied to a porous gamma-alumina substrate for a predetermined amount of time sufficient for the iron and nickel to fully infiltrate the pores of the substrate. The substrate was subsequently dried (in this case, the substrates were soaked at 110° C. for 12 hours) to deposit the metal ions onto the pore walls. The dried impregnated substrates were subsequently calcined to form oxides of the deposited nickel and iron (in this case, the substrates were calcined at 650° C. in air for 6 hours). Sufficient nickel nitrate was added such that all test samples contained about 15 weight percent NiO, and varying amounts of iron nitrate were added to yield alumina samples having about 2, 5, 10 and 15 weight percent $Fe_2O_3$ in addition to the NiO, with the balance being alumina. A reference sample was prepared having 15 weight percent NiO and no iron oxide. All samples were subsequently heated to about 800° C. and the iron and nickel oxide phases were investigated with XRD and TPR. The loading of iron and nickel on the alumina substrates is listed in Table 1.

TABLE 1

| No. | Catalyst | NiO wt. % | $Al_2O_3$ wt. % | $Fe_2O_3$ wt. % | BET $m^2/g$ |
|---|---|---|---|---|---|
| 1 | NAF00 | 15 | 85 | 0 | 158.2 |
| 2 | NAF02 | 15 | 83 | 2 | 156.9 |
| 3 | NAF05 | 15 | 80 | 5 | 151.9 |
| 4 | NAF10 | 15 | 75 | 10 | 141.4 |
| 5 | NAF15 | 15 | 70 | 15 | 137.9 |

As may be seen in Table 1, the BET results demonstrate that there is a slight decrease in specific surface area in the iron-promoted catalyst with increasing $Fe_2O_3$ additions compared with the baseline sample NAF00, from 158.2 $m^2/g$ to 137.9 $m^2/g$. This likely reflects the increase in loading of iron oxides components in the pores of gamma alumina in addition to the constant amount of NiO already added thereto.

Figure 1:
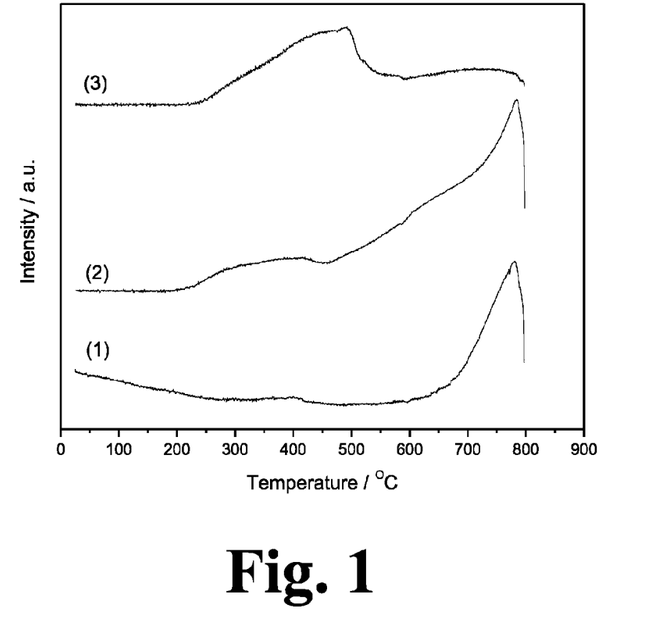
FIG. 1 graphically illustrates TPR patterns for various nickel-iron-aluminates catalyst compositions according to a first embodiment of the novel technology.

The TPR patterns below 800° C. are shown in FIG. 1. For the iron-free sample NAF00, one single reduction peak starts at 660° C. and reaches a peak value at about 782° C.; a weak and broad peak also appears at about 398° C. The peaks near 350° C. may likely be attributed to the reduction of nickel oxides, while those beyond 700° C. may likely be attributed to the formation of a nickel aluminum spinel $NiAl_2O_4$. The results suggest that nickel atoms participate mainly as nickel aluminum spinel, with a relative few existing as nickel oxide. For the iron-promoted catalyst NAF10, the introduction of iron gives rise to two different reduction peaks, with one peak occurring between about 216° C. and about 454° C., and the other being a shoulder peak forming around 638° C. on the main reduction peak.

For reference, a nickel-free alumina catalyst sample ($Fe_2O_3/Al_2O_3$) was prepared via wetness impregnation with 15 weight percent loading of $Fe_2O_3$ on gamma alumina, designated as AF15 for analysis via TPR. As shown in FIG. 1, a main broad reduction peak starts at about 218° C., reaches a maximum value of about 489° C., and ends at about 585° C., which covers the reduction peak below 454° C. in NAF10. Since $Fe^{2+}$ cannot normally be completely reduced to metallic Fe below 1000° C., the peak at 489° C. in AF15 is likely attributed to the reduction of $Fe^{3+}$ to $Fe^{2+}$ in iron oxides or iron alumina oxides. Accordingly, the peaks around 390° C. and 615° C. over iron-promoted samples NAF10 suggest that new crystal phases, such as iron oxide(s) and/or iron aluminum oxide(s) may have been formed in NAF10.

Figure 2:
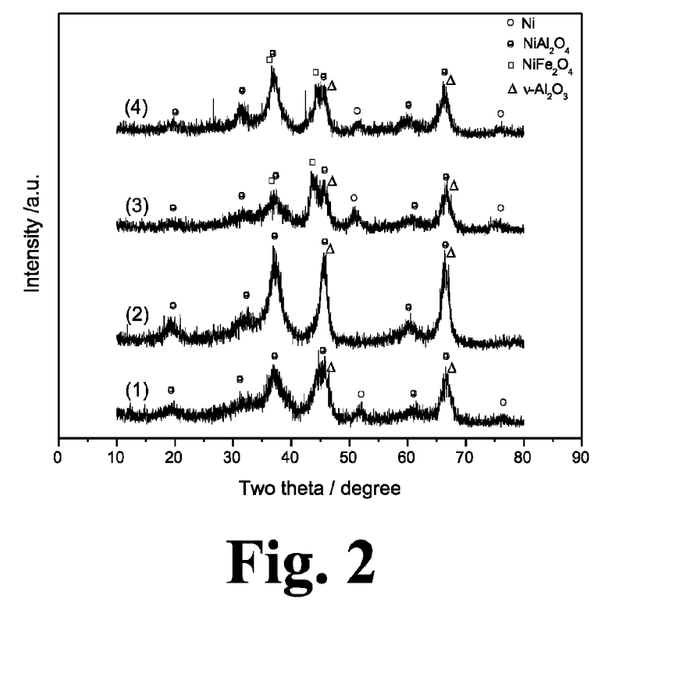
FIG. 2 graphically illustrates XRD analyses for iron-free nickel alumina and iron-nickel alumina catalyst compositions, both before and after exposure to ATRE, according to the novel technology.
Figure 3A:
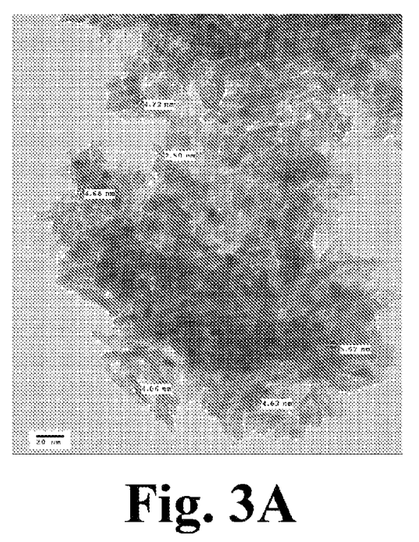
FIG. 3A is a photomicrograph of an as-produced iron free nickel-alumina catalyst material according to one embodiment of the novel technology.
Figure 3B:
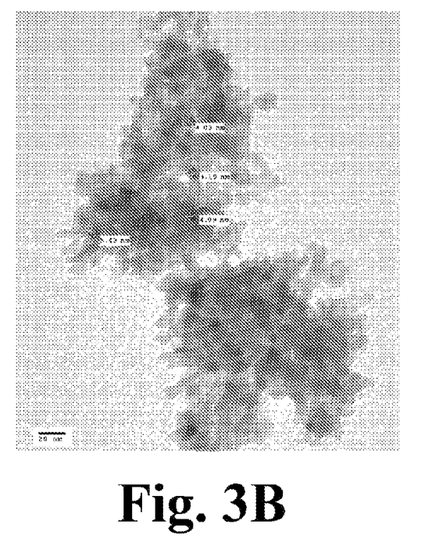
FIG. 3B is a photomicrograph of an as-produced iron-nickel-alumina catalyst material according to one embodiment of the novel technology.
Figure 3C:
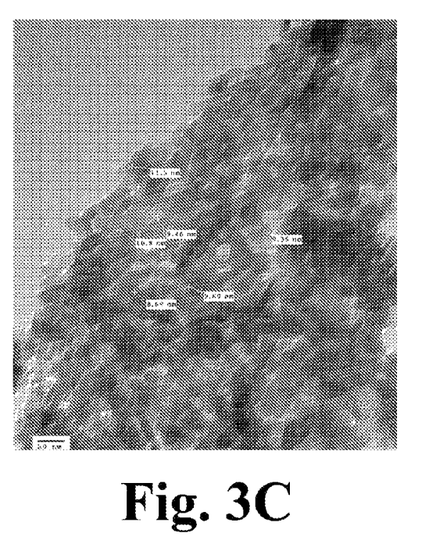
FIG. 3C is a photomicrograph of an iron free nickel-alumina catalyst material after exposure to ATRE, according to one embodiment of the novel technology.
Figure 3D:
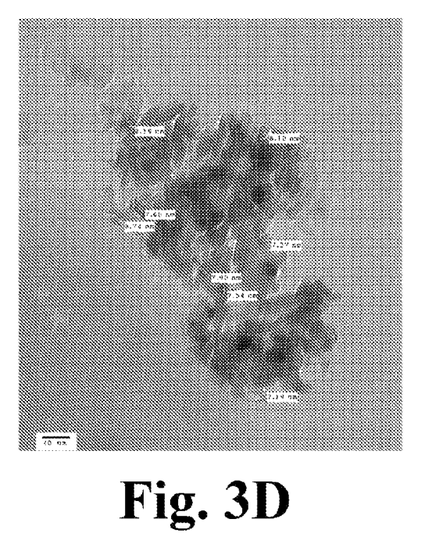
FIG. 3D is a photomicrograph of an iron-nickel-alumina catalyst material after exposure to ATRE, according to one embodiment of the novel technology.

The structure of the nickel-based catalysts compositions as a function of temperature were investigated using XRD, as illustrated in FIG. 2. For the iron-free sample NAF00, the characteristic peaks near 45.1 degrees, 37.0 degrees, 66.5 degrees, and 19.4 degrees indicate that a nickel aluminum spinel $NiAl_2O_4$ is formed by means of surface reconstruction of nickel and the gamma alumina crystal phase. This is consistent with the previous observations of NAF00 in TPR. The peaks at 51.9 degrees and 76.5 degrees suggest that some nickel atoms exist as $Ni^0$ after reduction for 6 hours. With iron introduced in NAF10, the main peaks near 45 degrees are broadened and shifted to a lower angle at 43.5 degrees, which is characteristic of iron aluminum spinel $FeAl_2O_4$. Further, the characteristic peaks of $NiAl_2O_4$ at 37.0 degrees and 66.5 degrees are broadened and shortened and the peak at 19.4 degrees is observed to become obscured. Because the ions of nickel and iron have similar ion radii ($Fe^{2+}$ 0.074 nm, $Fe^{3+}$ 0.064 nm, and $Ni^{2+}$ 0.069 nm), and because the spinel phases of $NiAl_2O_4$ and $FeAl_2O_4$ are categorized to the same space group (Fd 3m), it is likely that a mixed crystal phase $NiAl_2O_4$—$FeAl_2O_4$, likely of the form $Ni_{1-x}Fe_xAl_2O_4$, was formed. Meanwhile, within the mixed crystals, because of the heterogeneous distribution of atoms at the A site of the $AB_2O_4$ spinel crystal structure, it is postulated that more crystal defects in the crystal phases can be formed in the higher iron compositions, such as NAF10. Thus, the presence of more crystal defects results in a material that is accordingly more active for a catalytic reaction. The broadening and shifting of the peaks as discussed above seems to support the notion of a formation of mixed oxide crystals as well as the generation of more lattice defects. The peak for NAF10 at 51.9 degrees in FIG. 2 is more pronounced as compared with that for NAF00, which indicates that more nickel atoms in mixed crystals are available for reduction to $Ni^0$ in the NAF10 composition.

A durability analysis was likewise carried out over both the iron-free nickel catalyst NAF00 and the iron-promoted nickel catalyst NAF10 at 600° C. in ATRE. Regarding the NAF00 sample, the peaks at 45.1 degrees, 37.0 degrees, 66.5 degrees, and 19.4 degrees are intensified and noticeably sharpened, while the peak near 51.9 degrees substantially disappeared, which suggests that the crystal particle size is increased and the low valence nickel species, like $Ni^0$, no longer substantially exists within the NAF00 sample. For the ATRE tested NAF10 sample, the peaks at 45.1 degrees, 37.0 degrees, 66.5 degrees, and 19.4 degrees are also sharpened but are still weaker than that of the ATRE tested NAF00. The peak at 51.9 degrees is still visible, which indicates that $Ni^0$ is less likely to be oxidized in NAF10 during the ATRE test (as compared to the disappearance of same species in the ATRE tested NAF00). No diffraction peak of graphitic carbon at 26.2 degrees was observed on any of the so-tested samples, which suggests that the coke deposition may not be the direct reason for catalyst deactivation.

The surface oxide particle size was estimated based on the Debey-Sherrer equation. For the iron-free sample NAF00, the mean particle size of nickel alumina oxides is about 4.6 nm, based on the peak broadening near 37 degrees. A slight decrease of particle size of the mixed crystals is observed over iron-promoted fresh NAF10 which is estimated at 4.3 nm near 37 degrees. For ATRE tested samples, all mean particle sizes are increased, but iron obviously constrains the sintering. A particle size of 10.1 nm over tested NAF00 is obtained, while with iron promotion 7.2 nm of used NAF10 is obtained.

FIG. 3 illustrates TEM images of the fresh nickel-based catalyst samples as well as the ATRE-tested samples. For fresh samples, there are some particles supported on gamma-alumina in NAF00, with a mean size range from 4.06 nm-5.57 nm, while in the iron-promoted sample NAF10 the particle sizes range from 4.03 nm-5.43 nm. For ATRE-tested samples, all particle sizes seem to have increased, such as for the ATRE-testes NAF00 sample particle sizes range from 9.36 nm to 11.3 nm, while those in the ATRE-tested NAF10 sample range from 7.19 nm to 8.74 nm. The particle size data obtained from the TEM images are consistent with those obtained from the XRD studies.

Figure 4A:
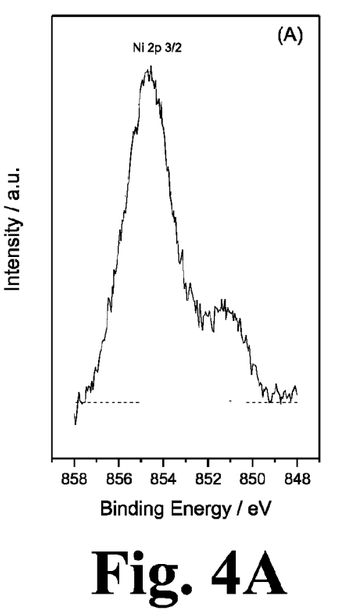
FIG. 4A graphically illustrates the Ni $2p_{3/2}$ XPS spectra of the iron-free nickel-based catalyst prior to ATRE.
Figure 4B:
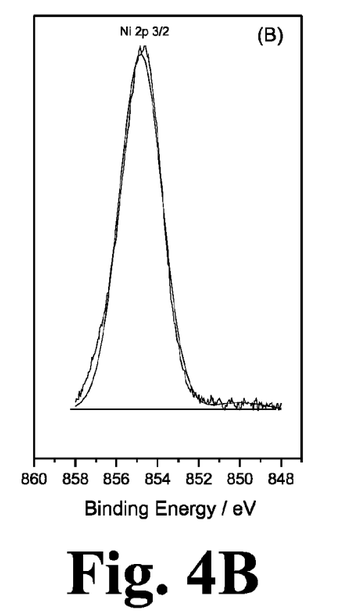
FIG. 4B graphically illustrates the Ni $2p_{3/2}$ XPS spectra of the iron-free nickel-based catalyst after exposure to ATRE.

The electronic properties of the samples were investigated via a pass energy of 30 eV with a step size of 0.05 eV to generate Ni 2p and Fe 2p XPS spectra. As shown in FIG. 4, the characteristic peaks at 852.60 eV and 855.75 eV corresponding to $Ni^0$ and $Ni^{2+}$, respectively, are observed over the fresh NAF00 sample, but the $Ni^0$ peak disappears over the ATRE-exposed NAF00 sample. This suggests that the reduced sample, fresh NAF00, is oxidized in ATRE, which is consistent with the XRD results and can explain the oxygen emergence in the tail gas in the aging test (as discussed below).

Figure 4C:
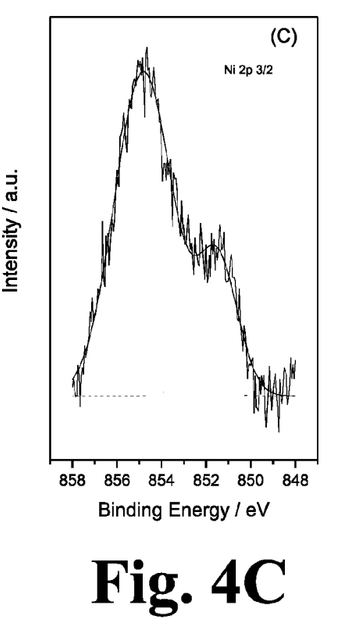
FIG. 4C graphically illustrates the Ni $2p_{3/2}$ XPS spectra of the iron-nickel-based catalyst prior to ATRE.
Figure 4D:
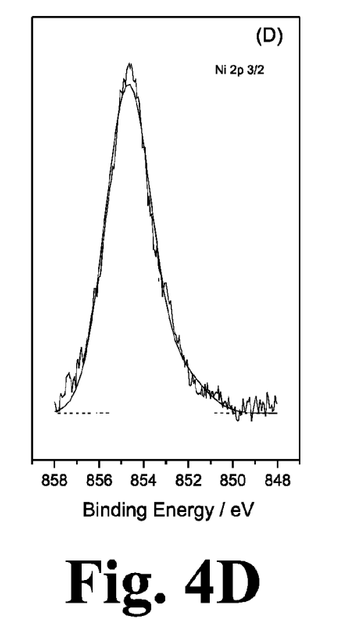
FIG. 4D graphically illustrates the Ni $2p_{3/2}$ XPS spectra of the iron-nickel-based catalyst after exposure to ATRE.
Figure 5A:
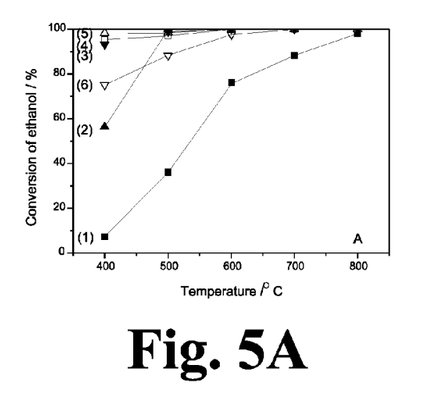
FIG. 5A graphically illustrates the conversion of ethanol as a function of temperature during ATRE for catalyst compositions including porous alumina without additives and having nickel-based oxides infiltrating the pores with no iron, 2 percent iron, 5 percent iron, 10 percent iron and 15 percent iron.
Figure 5B:
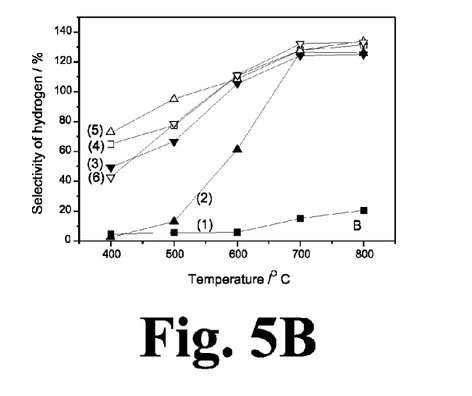
FIG. 5B graphically illustrates the selectivity of hydrogen as a function of temperature during ATRE for catalyst compositions including porous alumina without additives and having nickel-based oxides infiltrating the pores with no iron, 2 percent iron, 5 percent iron, 10 percent iron and 15 percent iron.
Figure 5C:
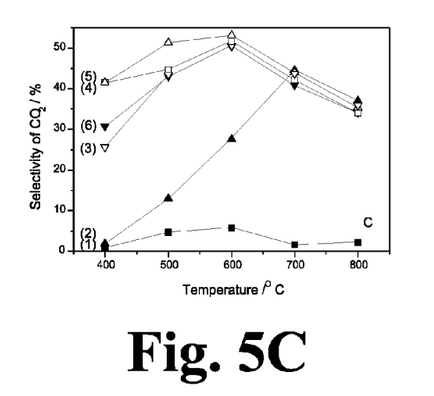
FIG. 5C graphically illustrates the selectivity of $CO_2$ as a function of temperature during ATRE for catalyst compositions including porous alumina without additives and having nickel-based oxides infiltrating the pores with no iron, 2 percent iron, 5 percent iron, 10 percent iron and 15 percent iron.
Figure 5D:
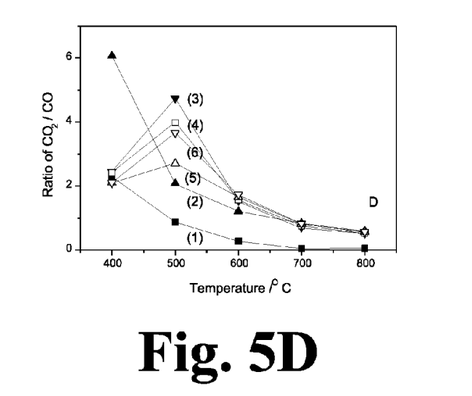
FIG. 5D graphically illustrates the ratio of $CO_2$ to CO as a function of temperature during ATRE for catalyst compositions including porous alumina without additives and having nickel-based oxides infiltrating the pores with no iron, 2 percent iron, 5 percent iron, 10 percent iron and 15 percent iron.
Figure 5E:
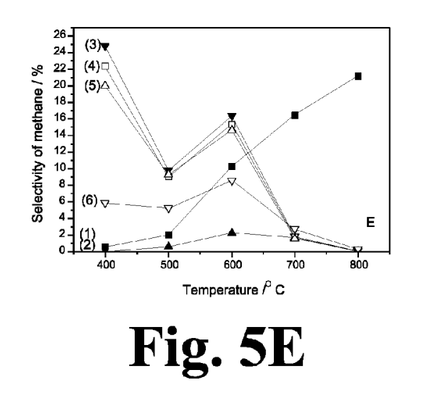
FIG. 5E graphically illustrates the selectivity of methane as a function of temperature during ATRE for catalyst compositions including porous alumina without additives and having nickel-based oxides infiltrating the pores with no iron, 2 percent iron, 5 percent iron, 10 percent iron and 15 percent iron.
Figure 5F:
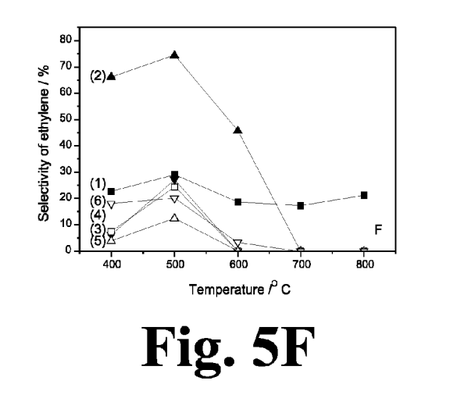
FIG. 5F graphically illustrates the selectivity of ethylene as a function of temperature during ATRE for catalyst compositions including porous alumina without additives and having nickel-based oxides infiltrating the pores with no iron, 2 percent iron, 5 percent iron, 10 percent iron and 15 percent iron.

For NAF10 with iron promotion, a stronger $Ni^0$ characteristic peak emerges in the fresh sample compared with that of the fresh NAF00, which supports the XRD results that more nickel atoms in mixed crystals may be more readily reduced to $Ni^0$. For the ATRE-exposed sample NAF10, the $Ni^0$ characteristic peak is reduced but is still quite visible and stronger than that of the ATRE-exposed NAF00 sample. This suggests some $Ni^0$ atoms are still stable after exposure to the oxidizing atmosphere of ATRE.

As mentioned above, the series of catalysts compositions listed in Table 1 were prepared and tested in an environment conducive to the auto-thermal reforming of ethanol as part of an investigation of the compositions as effective catalyst systems, characterized by relatively high activity and selectivity to hydrogen at low temperatures for the purpose of hydrogen generation. Auto-thermal reforming of ethanol was conducted in a continuous flow, fixed-bed quartz micro-reactor under atmospheric pressure. Catalysts (grain size of about 20 to about 40 mesh) were loaded and reduced under a $H_2/N_2$ mixture atmosphere at about 650° C. for 6 hours. A water-ethanol mixture was fed by a liquid pump and vaporized at 160° C.; the water-ethanol vapor was then mixed with oxygen and nitrogen (as an internal standard) under conditions governed by mass flow meters. The vapor mixture was introduced into the reactor through heated lines with a molecular ratio of $C_2H_5OH:H_2O:O_2$ of 2:6:1 for ATRE. The calculation equations were listed as follows:

$$X_{ethanol} = \frac{F_{ethanol\ in} - F_{ethanol\ out}}{F_{ethanol\ in}}$$

$$S_{i\ carbon-containing\ product} = \frac{F_{i\ carbon-containing\ product}}{n_i \cdot (F_{ethanol\ in} - F_{ethanol\ out})}$$

$$S_{H_2} = \frac{F_{H_2 produced}}{3(F_{ethanol\ in} - F_{ethanol\ out})}$$

$$Y_{H_2} = X_{ethanol} \cdot S_{H_2} = \frac{F_{H_2 produced}}{3 \cdot F_{ethanol\ in}}$$

$$\text{Ratio of oxygen to carbon} = \frac{2F_{O_2 in} + F_{H_2O\ in} + F_{ethanol\ in}}{2 \cdot F_{ethanol\ in}}$$

In the above equations, $X_{ethanol}$ and $S_i$ represent the ethanol conversion and the product selectivity, respectively. $F_{i,\ in\ or\ out}$ is the molar flow rate of the i species at the inlet or at the outlet of the reactor and $n_i$ is the stoichiometric factor between the carbon-containing products and ethanol. With the above definition, and with water not considered part of the fuel, the selectivity of hydrogen can potentially exceed 100% if all of the H atoms from ethanol and some from the water are converted to $H_2$. The mass balance of carbon and hydrogen is typically within a ±5% error range.

The effluent was analyzed online through tubing wrapped with heating tape via gas chromatography. The gas chromatograph was equipped a molecular sieve and TCD and FID detectors.

With the introduction of iron to the nickel-alumina system, nickel, iron and aluminum complex oxides are formed upon calcination. These complex oxides yield attractive reduction properties and surface electronic properties. Further, an increased amount of nickel atoms exist as $Ni^0$ on the sample surface with increasing iron content. Ultimately, a significant enhancement of catalytic activity and hydrogen selectivity in auto-thermal reforming of ethanol is achieved through the addition of iron to the system. For example, a 10 weight percent loading of iron oxide to the standard aluminum oxide substrate having a 15 weight percent addition of nickel oxide will, after calcinations, yield a conversion of ethanol at 98.43% and selectivity of hydrogen at 108.71% at 600° C. in ATRE, which is higher than that of iron-free reference samples by 47.44% on hydrogen selectivity.

All product selectivities to any species were calculated on an atomic carbon basis for carbon containing products, or an atomic hydrogen basis for hydrogen containing products. Selectivity is defined as (atoms in the product species)/(atoms in the converted fuel)

and fuel does not include water. Therefore, the 3 mol of $H_2$ contained in 1 mol of ethanol represents that selectivity of hydrogen equal to 100% regardless of amount of water added as a reactant. By this definition, selectivity of hydrogen may potentially exceed 100% if all of the H atoms from ethanol and some from the water are converted to $H_2$. Mass balance on carbon and hydrogen typically is within ±5% error range.

The temperature-programmed reduction (TPR) measurements were conducted in a downstream fixed-bed quartz tube reactor at atmospheric pressure. Calcined samples (listed in Table 1) were stabilized to a stream of flowing $H_2/N_2$ mixture (5.0% $H_2$) characterized by a flow rate of 25 ml/min. The temperature was then increased from room temperature to 800° C. at a linear heating rate of about 10° C./min. The uptake of hydrogen was recorded via TCD.

X-ray diffraction (XRD) analyses were carried out by an X-ray diffractometer equipped with a graphite monochromator for Cu K-alpha radiation at a voltage of 50 kV and a current of 40 mA. X-ray photoelectron spectroscopy (XPS) was recorded by a spectrometer using Al K-alpha radiation (1486.6 eV). Pass energy of 160 eV and 20 eV was used for acquisition of survey and region spectra, respectively. The binding energies were calibrated relative to C1s peak from carbon contamination of the samples at 284.6 eV. Atomic concentrations were calculated from photoelectron peak areas subtracting the Shirley background.

The BET specific surface area of the calcined sample was measured at −196° C. by nitrogen adsorption. All samples were degassed at 200° C. for 30 minutes. Transmission electron microscopy (TEM) was used to analyze the morphology of catalyst samples.

As shown in FIGS. 5A-5F, nickel-alumina catalysts were tested in auto-thermal reforming of ethanol (ATRE). Since a homogeneous ethanol reforming reaction can take place without catalysts within the 400° C. and 800° C. range, ATRE was carried out in a quartz sands packed fixed bed as homogenous reactor. In this homogenous reaction, as shown by curve (1) in FIG. 5A, the conversion of ethanol increases from 7.26% to 98.01% as temperature increases from 400° C. to 800° C., respectively. However, the selectivity of hydrogen remains low level, from 4.47% to 20.52% (see FIG. 5B). Regarding the carbon selectivity, most of carbon-containing products exist as acetaldehyde (in the range from 68.93% to 41.77%) at temperatures below 600° C., which may be attributed to the ethanol dehydrogenation reaction. The selectivity of ethylene (see FIG. 5F) is at a relative high level between 18.63% and 29.05%. The selectivity of carbon dioxide is relatively low (not more than 5.75%) at all temperatures (see FIG. 5C). As the temperature goes up to 800° C., the selectivity of CO increases significantly, peaking at about 48.29%. Consequently, the ratio of $CO_2$ to CO decreases continually from 2.29 to 0.05 (see FIG. 5D), which is a convenient indicator of reaction activity in the water-gas shift reaction. The selectivity of methane also increases with temperature, from 0.57% to 21.16% (see FIG. 5E). Based on these homogenous reaction results, the dominant reaction is the dehydrogenation of ethanol at low temperatures, and the steam reforming reaction and reverse water-gas shift reaction (RWGSR) then predominate at higher temperature, while the dehydration reaction of ethanol is always as an important reaction within the whole temperature range.

For catalytic reaction system, the reaction activity gains significantly at low temperature. For the baseline iron-free nickel-alumina catalyst (NAF00), the conversion of ethanol jumps from 7.26% to 56.30% at 400° C. (homogeneous vs. Ni catalyst), but the selectivity to hydrogen still dwells at low value of about 2.59%. The selectivity to $CO_2$, CO and $CH_4$ also remain relatively low. Meanwhile, a marked increase in the selectivity to ethylene, i.e. from 22.73% to 66.20%, was observed. This increase is accompanied by a notable decrease in the selectivity to acetaldehyde, i.e. from 68.93% to 16.96%. The results suggest that iron-free nickel based catalysts promoted the ethanol dehydration reaction at expense of a loss in ethanol dehydrogenation at low temperature. As temperature goes up, the conversion of ethanol increases sharply and was observed to reach approximately 100%. The selectivity of hydrogen increases to 13.26% at 500° C., then sharply to 61.27% at 600° C., and finally reaches about 126% at temperatures beyond 700° C. The variation of hydrogen selectivity can be seen as a result of variation in the carbon-contained product selectivity as trace acetaldehyde produced, the decrease of ethylene, and methane consumed by steam reforming reaction at higher temperatures. Similar to the homogenous reaction, the ratio of carbon dioxide to carbon monoxide decreases as the thermodynamic equilibrium of RWGSR becomes dominant instead of dynamic control at higher temperatures.

Over the iron-promoted nickel based alumina catalyst compositions, the observed catalytic activities for ethanol conversion and hydrogen selectivity increase, especially at relatively low temperatures below 600° C. The enhanced catalytic performance increases with the Fe loading of the Ni catalyst and peaks with 10 weight percent addition of iron oxide to the system (NAF10). For the NAF10 composition, a 98.28% conversion of ethanol is observed at 400° C., and nearly 100% at higher temperatures; 73.12% for hydrogen selectivity at 400° C., 94.93% at 500° C., and 108.71% at 600° C., respectively. Higher iron content, 15 wt. % in NAF15, leads to an obvious loss both in the conversion of ethanol, down to 75.02% at 400° C., to 88.26% at 500° C., respectively, as well as a decrease in the selectivity to hydrogen, down to 42.62% at 400° C., 78.61% at 500° C., respectively. As the temperature increases to 700° C. or beyond, hydrogen selectivity over all the Fe promoted catalyst compositions increases continuously and exceeds 120%, while the differences among those of iron promoted catalysts narrows. Over all, the 10 weight percent iron oxide loaded nickel-alumina catalyst (NAF10) performs better for its high activity and hydrogen selectivity at low temperatures. The reason may be attributed to the carbon selectivity: iron-promoted Ni catalyst restrains the dominant reaction of ethanol dehydration reaction over iron free Ni catalyst (NAF00), and promotes the transform of acetaldehyde from the ethanol dehydrogenation to formation of hydrogen molecules at low temperatures. As a result, the selectivity of ethylene and acetaldehyde decreases significantly, while the overall selectivity of carbon dioxide and carbon monoxide increases obviously, which is due to a gain for steam reforming reaction. Meanwhile, the selectivity to methane increases, which can be attributed to the hydrogenation of carbon monoxide or carbon dioxide by iron promotion.

Figure 6:
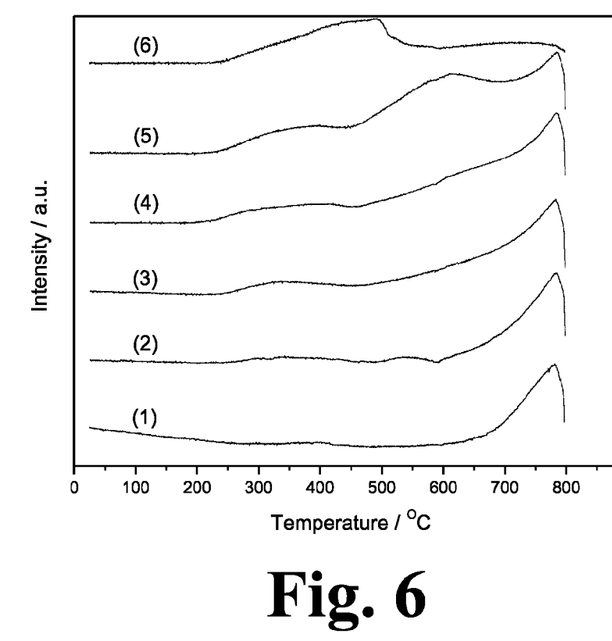
FIG. 6 graphically illustrates the TPR patterns as a function of temperature for various catalyst compositions.

The TPR patterns below 800° C. are shown in FIG. 6. For iron-free sample NAF00, one single reduction peak starts at 660° C., the peak temperature occurs around 781.5° C., and a weak and broad peak appears at 398° C. Peaks near 350° C.

can be attributed to the reduction of nickel oxides, while those beyond 700° C. to nickel aluminum spinel. The results suggest that nickel mainly exists as nickel aluminum spinel, with little as nickel oxides. For iron promoted nickel catalysts, the introduction of iron results in two more reduction peaks comparing with NAF00. A first peak emerges about 332° C. in the NAF02 material, and becomes stronger with increasing loading of iron, then shifts to a higher temperature of 390° C. for the NAF05, NAF10, and NAF15 samples. Another peak forms around 615° C., and becomes stronger over samples with higher iron loading. To test alumna supported iron catalyst, a sample of $Fe_2O_3/Al_2O_3$ (with 15 weight percent loading of $Fe_2O_3$ on gamma alumina, noted as AF15) was prepared and tested in TPR. A main reduction peak starts becomes visible 218° C., reaches peak temperature of 489° C., and ends at 585° C., which is different from either iron contained or iron free nickel based samples. Thus, the peaks around 390° C. and around 615° C. over iron promoted samples suggest that new crystal phases like nickel iron oxides or iron aluminum oxides may be formed.

Figure 7:
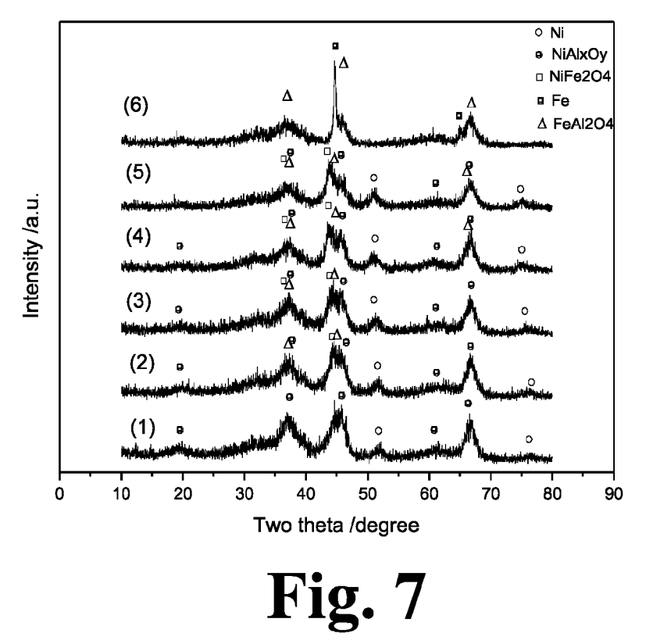
FIG. 7 graphically illustrates the XRD patterns for various catalyst compositions.

The crystal structure of the above compositions was investigated by reducing the iron promoted nickel based catalysts at 650° C. for 6 hours followed by screening via XRD. For iron free sample NAF00, the characteristic peaks near 45.1 degree, 37.0 degree, 66.5 degree, and 19.4 degree indicate that nickel aluminum oxides ($NiAl_xO_y$), such as $NiAl_2O_4$, $NiAl_{10}O_{16}$, $NiAl_{26}O_{40}$ and $NiAl_{32}O_{49}$ phases, are formed by means of nickel diffusing into alumina crystal phase. (See FIG. 7). This agrees with the result of NAF00 in TPR. Peaks at 51.9 degree and 76.5 degree suggest that some nickel atoms exist as $Ni^0$ phase over the reduced sample. With iron introduced, as shown in FIG. 7, the main peaks near 45 degree are broadened and shifted to lower angle at 43.5 degree; meanwhile, the characteristic peaks of nickel aluminum oxide at 37.0 degree and 66.5 degree are broadened and shortened; furthermore, the peak at 19.4 degree becomes obscure. This indicates that the main crystal phase of nickel alumina oxides is distorted by iron, and more crystal defects in crystal phase are formed, giving rise to increased activity for catalytic reaction. The peak at 51.9 degree is intensified, which indicates more nickel atoms exist as $Ni^0$. The characteristic peak shifting and broadening near 45.1 degree and 37.0 degree suggests some other phases are formed, such as nickel iron oxide and/or aluminum iron oxide and/or the like. Meanwhile, the particle size was estimated with Debey-Sherrer equation. For iron free sample NAF00, the mean particle size of nickel alumina oxides was determined to be about 4.6 nm using the peak broadening near 37 degree. With iron introduction, a slight decrease was observed in the calculated mean particle size of crystal phase near 37 degree, which is varied between 4.5 nm and 4.2 nm with iron loading increase.

As shown in Table 1, with impregnation of iron, the samples' surface areas decrease with increasing iron loading, from 158.2 m²/g on NAF00 to 137.9 m²/g on NAF15 by a factor of 12.83%. This observation may be attributed to the loading of additional iron oxide, and the subsequent formation of nickel-iron components, in the pores of the alumina substrate.

Figure 8A:
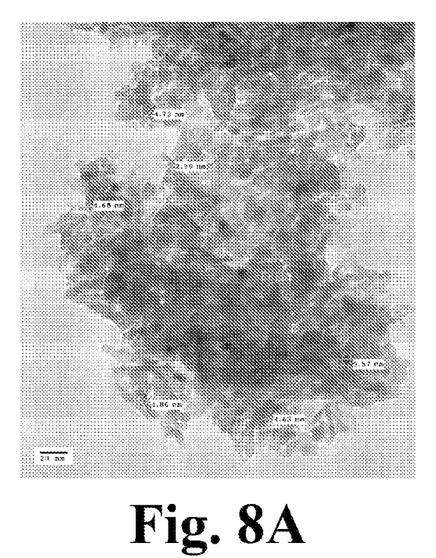
FIG. 8A is a photomicrograph of catalyst composition NAF00.
Figure 8B:
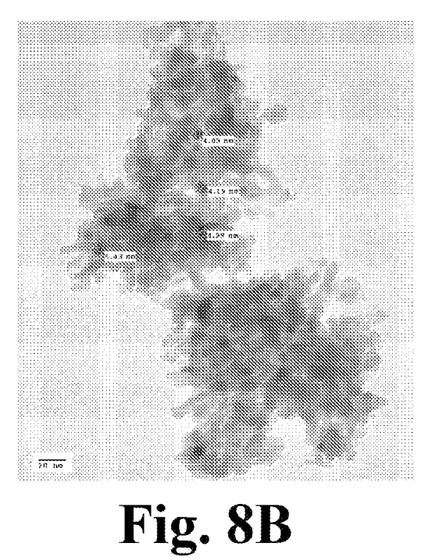
FIG. 8B is a photomicrograph of catalyst composition NAF10.

The samples' morphology was investigated via TEM images of the reduced nickel based catalyst samples, as illustrated in FIGS. 8A-8B. The NAF00 has particles supported on gamma-alumina, with a mean size range around 4.06 nm-5.57 nm, while the iron promoted samples have particles ranging from about 4.03 nm-5.43 nm, which is consistent with the range of particle size range obtained by XRD. The TEM result suggests that the crystal structure or electronic properties may be as or more important than morphology for the catalytic performance variation.

Figure 9A:
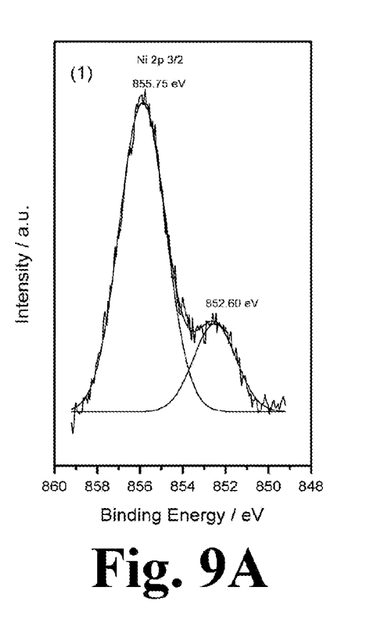
FIG. 9A graphically illustrates the XPS pattern of catalyst composition NAF00.
Figure 9B:
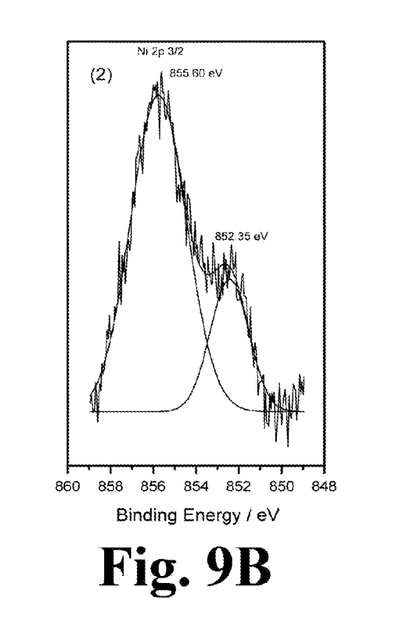
FIG. 9B graphically illustrates the XPS pattern of catalyst composition NAF10.

XPS spectra using a pass energy of 30 eV with a step size of 0.05 eV were obtained via spectrometer. As shown in FIGS. 9A and 9B, the XPS pattern of Ni 2p of reduced NAF00 shows that two peaks emerge at binding energies of 855.75 eV and 852.60 eV, which correspond to the characteristic peaks of $Ni^{2+}$ and $Ni^1$, respectively. With iron promotion, the Ni 2p patterns vary in their position and intensity. For the NAF10 material, all peaks shift to lower positions by about 0.15 eV to 0.25 eV, and the peak at 852.35 eV is intensified, which indicate that the content of $Ni^0$ is increased. Thus, that the doping of the nickel-alumina catalyst material with iron appears to decrease the binding energy of Ni atoms, allowing more Ni atoms exist as $Ni^0$ on catalyst particle surface.

For comparison, the alumina substrate sample infiltrated with 15 weight percent iron, designated AF15, was exposed to ATRE under the same reaction conditions. A mild conversion of ethanol (80.19%) and a very low selectivity of hydrogen (8.45%) were observed. Meanwhile, high acetaldehyde selectivity (57.37%) and low CO, $CO_2$, and $CH_4$ selectivity suggests that iron aluminum spinel in the iron-based catalyst promotes the ethanol dehydrogenation reaction but has limited activity to transform acetaldehyde to C1 products and $H_2$.

For auto-thermal reforming of ethanol, the first step is the activation of ethanol, which typically occurs via one of two routes. First, ethanol may be dehydrated to ethylene (see equation 1 below) which typically leads to a strong adsorption of ethylene on active sites and results in coke deposition via polymerization (see equation 2 below). Alternately, ethanol may be dehydrogenated to acetaldehyde (see equation 3 below), which is then further transformed into $CH_4$, CO, $CO_2$, and $H_2$, such as via steam reformation (SR), water-gas shift reaction (WGSR), and partial oxidation reaction (POR) with steam and oxygen gas in the reaction network (see equations 4-9 below). For our purposes, the dehydrogenation route is more favorable to hydrogen generation.

$$C_2H_5OH \rightarrow C_2H_4 + H_2O \qquad (1)$$

$$C_2H_4 \rightarrow C_nH_{2n} \rightarrow C \qquad (2)$$

$$C_2H_5OH \rightarrow CH_3CHO + H_2 \qquad (3)$$

$$CH_3CHO \rightarrow CH_4 + CO \qquad (4)$$

$$CH_3CHO + H_2O \rightarrow 2CO + 3H_2 \qquad (5)$$

$$CH_4 + H_2O \rightarrow CO + 3H_2 \qquad (6)$$

$$CO + H_2O \rightarrow CO_2 + +H_2 \qquad (7)$$

$$CH_4 + \tfrac{1}{2}O_2 \rightarrow CO + 2H_2 \qquad (8)$$

$$CO + \tfrac{1}{2}O_2 \rightarrow CO_2 \qquad (9)$$

Based on the characterizations and reaction results, the partially reduced nickel aluminum spinel $NiAl_2O_4$ plays an important role in ATR of ethanol in the Ni-based catalyst NAF00, which has high activity for acetaldehyde conversion but favors ethanol dehydration route. At the beginning of the ATR process, ethanol is converted to acetaldehyde via dehydrogenation and further converted to C1 products and $H_2$ over the partially reduced $NiAl_2O_4$; as a result, a relative high selectivity to hydrogen at the beginning can be obtained. Over time, because of the poor resistance to oxidation and sintering in oxidative atmosphere of ATR, the partially reduced nickel atoms ($Ni^0$) disappear and the mean particles size of $NiAl_2O_4$ increases by about 20 percent. Accordingly, the ethanol dehydrogenation route is restrained and the dehydration route dominates the reaction. Consequently, ethylene becomes the dominant product, and hydrogen selectivity is decreased to only 19.71% within 26 hours.

With the addition of iron, a spinel phase $NiAl_2O_4$—$FeAl_2O_4$ is formed, such as in the NAF10 material. The catalytic properties of the material are then modified with regards to its structural and electronic properties: the $NiAl_2O_4$ crystal is distorted because of the addition of a heterogeneous distribution of iron atoms. Further, more defect sites are formed, giving rise to greater activity for reactants' adsorption and activation. Also, more nickel atoms may be reduced to $Ni^0$ after reduction, and the so-generated $Ni^0$ tends to remain relatively stable in the iron-promoted catalyst. Accordingly, more active sites with high activity of acetaldehyde conversion are formed within the partially reduced $NiAl_2O_4$. Further, the presence of $FeAl_2O_4$ promotes the ethanol dehydrogenation reaction over the ethanol dehydration route.

The synergistic effect by the presence of $NiAl_2O_4$—$FeAl_2O_4$ mixed crystals thus urges the reaction network into the dehydrogenation route catalyzed by $FeAl_2O_4$, accompanied with a higher activity of acetaldehyde transformation to C1 products and $H_2$ through SR, POR and WGSR processes as catalyzed by the partial reduced $NiAl_2O_4$. This synergistic effect may explain the observed initial high selectivity of hydrogen of the iron-promoted catalyst. One the other hand, because of the coordination change in the mixed crystal phase, more nickel atoms may be reduced to low valence as $Ni^0$, and, more importantly, the $Ni^0$ remains stable over time the oxidative atmosphere of ATR. Sintering is also suppressed in the mixed crystals at elevated temperatures over time. Consequently, durability and stability, combined with high catalytic activity, is achieved by exploiting the synergistic effect of the iron-doped $NiAl_2O_4$ crystals (which may include $FeAl_2O_4$ crystals and/or nickel-iron-aluminate material of the form $Ni_xFe_{1-x}Al_2O_4$ and/or some mixture of both or the like) in their structural and electronic properties.

Thus, the specific surface area of iron-promoted nickel catalysts decreases with increasing loading of iron, while little difference in the morphology is observed. The presence of iron mainly impacts the samples' structure and electronic properties. For iron free nickel catalysts, nickel is present mainly in the form of nickel alumina oxides, which actively contribute in ATRE. With the introduction of iron, nickel alumina oxide crystal phases become distorted and some new crystal phases, such as nickel iron oxide and iron alumina oxide, may be formed. These phases are indicated by the broadening and position shift of XRD peaks. The reduction peaks in TPR patterns support the crystal phase change and interaction between nickel and the alumina substrate; more defect sites in the crystal structure are thus postulated. Furthermore, with additional iron doping, more Ni atoms at low valence in iron alumina oxide and nickel iron oxide phases are stabilized over nickel based catalysts, which could contribute to the production of sites for reactant adsorption and activation other than $Ni^{2+}$. As a result, the reaction route of ATRE appears to be shifted to the dehydrogenation route. Accordingly, the activity and selectivity are improved, especially at low temperatures. This agrees with the observed reaction results. Thus, it appears that the modification in crystal phases of nickel alumina, nickel iron oxide and iron alumina oxide results in a significant improvement in ATRE. Additionally, it is possible to further modify or 'fine-tune' the catalytic properties of the system through the incorporation of additional dopants, such as cobalt, copper, molybdenum, cerium, zirconium, or the like, which may further distort the crystal lattice(s) and thus impact the catalytic properties of the system.

Thus, the presence of iron plays an important role in nickel based catalysts for its enhancement of catalytic activity and hydrogen selectivity in auto-thermal reforming of ethanol. At a level of about 10 weight percent Fe loading Ni catalyst, the conversion of ethanol at about 98.5 percent and selectivity of hydrogen at about 110 percent may be achieved at 600° C. in ATRE, which is higher than that of iron-free samples by about 45 percent for hydrogen selectivity.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A composition for catalyzing the auto-thermal reformation of ethanol, comprising:
    a porous refractory substrate having a plurality of pores; and
    a nickel-iron-aluminum oxide material at least partially filling the pores.

2. The composition of claim 1 wherein the refractory substrate is substantially alumina.

3. The composition of claim 1 wherein the refractory substrate contains aluminum oxide.

4. The composition of claim 1 wherein the nickel-iron-aluminum oxide material includes $NiAl_2O_4$—$FeAl_2O_4$ spinel.

5. The composition of claim 4 wherein the nickel-iron-aluminum oxide material further includes metallic nickel.

6. The composition of claim 1 wherein the refractory substrate contains aluminum oxide and wherein the nickel-iron-aluminum oxide material includes $NiAl_2O_4$—$FeAl_2O_4$ spinel.

7. The composition of claim 1 wherein the substrate has a temperature of at least about 600 degrees Celsius; wherein the substrate dehydrogenates ethanol upon contact yield acetaldehyde.

8. A material for catalyzing the auto-thermal reformation of ethanol, comprising:
    a refractory substrate portion;
    a plurality of pore walls formed in the refractory substrate portion; and
    a nickel-iron-aluminum oxide portion coating the pore walls.

9. The material of claim 8 wherein the refractory substrate portion is selected from the group including alumina, silica, mullite, zeolite, titania, zirconia, and ceria.

10. The material of claim 8 wherein the nickel-iron-aluminum oxide material includes $NiAl_2O_4$—$FeAl_2O_4$ spinel.

11. The material of claim 8 wherein the nickel-iron-aluminum oxide material is substantially free of NiO.

12. The material of claim 8 wherein the substrate has a temperature of at least about 600 degrees Celsius; wherein the substrate dehydrogenates ethanol upon contact yield acetaldehyde.

13. A structure for supporting the auto-thermal reformation of ethanol, comprising:
    a refractory pore wall; and
    a nickel-iron-aluminum oxide composition coating the pore wall.

14. The structure of claim 13 wherein the nickel-iron-aluminum oxide composition is a $NiAl_2O_4$—$FeAl_2O_4$ spinel.

* * * * *